United States Patent [19]
Su et al.

[11] Patent Number: 5,653,476
[45] Date of Patent: Aug. 5, 1997

[54] LEAKPROOF ROTARY JOINT

[75] Inventors: Yaw Terng Su; Chuen Chyi Horng, both of Kaohsiung; Jia Yang Jang, Chung-Li; Jiunn Chyi Wu, Kee-Lung, all of Taiwan

[73] Assignee: National Science Council of Republic of China, Taipei, Taiwan

[21] Appl. No.: 529,719

[22] Filed: Sep. 18, 1995

[51] Int. Cl.$^6$ ............................................. F16L 27/12
[52] U.S. Cl. ............................ 285/272.1; 285/14; 285/94; 285/281; 285/375
[58] Field of Search ............................ 285/14, 93, 94, 285/122, 123, 279, 281, 276, 375, 190

[56] References Cited

U.S. PATENT DOCUMENTS

| | | | |
|---|---|---|---|
| 2,305,725 | 12/1942 | Meyer | 285/281 |
| 3,002,769 | 10/1961 | Deubler et al. | 285/276 X |
| 3,501,174 | 3/1970 | Walker | 285/279 |

FOREIGN PATENT DOCUMENTS

| | | | |
|---|---|---|---|
| 858507 | 1/1961 | United Kingdom | 285/281 |

*Primary Examiner*—Terry Lee Melius
*Assistant Examiner*—Heather Shackelford
*Attorney, Agent, or Firm*—Bacon & Thomas

[57] ABSTRACT

A rotary joint for delivering a mixed fluid from a radial inlet of a joint element axially through a high speed rotating shaft. Leakproof protection is first realized by one side of a wear block being compressed against an end face of the shaft. A spring presses a washer and an O-shaped ring against the other side of the wear block to prevent leakage and filter most solid impurities. Leakproof protection is also realized by covering the shaft with a seal to isolate leaking fluid from the first protection.

4 Claims, 3 Drawing Sheets

LEAKPROOF ROTARY JOINT

BACKGROUND OF THE INVENTION

1. Field of the Invention

The invention pertains to a rotary joint which delivers a mixed fluid axially through a high-speed rotating shaft and prevents the mixed fluid from leaking to the surrounding area.

2. Description of the Prior Art

For some processes, a mixed fluid has to be delivered axially through a rotating shaft. Therefore, it requires a rotary joint to supply the mixed fluid while the shaft is rotating. However, traditional rotary joints are used in the environment for supplying only a pure fluid (for example water, oil, etc.) as disclosed by several patents, such as U.S. Pat. Nos. 5,303,959, 5,226,677 and 5,209,526. The structural designs of these rotary joints are only suitable for supplying a pure fluid and not for supplying a mixed fluid such as grinding materials, impure water and so on. Once those rotary joints supply a mixed fluid with solid materials such as grinding materials, impure water and so on, impurities will easily leak to the bearing structure and cause it damage and failure. Furthermore, rotating wear causes some parts of rotary joints to malfunction so that those parts are difficult or impossible to be replaced. Therefore, the present invention overcomes these structural defects. After continuous tests and experiments, the inventor has developed a leakproof rotary joint which totally eliminates traditional structural defects.

SUMMARY OF THE INVENTION

It is the main object of this invention to provide a rotary joint with leakage protection. The rotary joint comprises two structural designs for leakage protection. The first leakage protection includes a wear block and an end face of a shaft compressing tightly against each other with an O-ring for outer leakage protection. In addition, a washer and a spring presses the wear block and the end face of the shaft tightly in order to prevent primary leakage and filter most solid impurities. The second leakage protection involves covering the shaft center with a shaft seal to seal the shaft surface tightly in order to isolate the leaking fluid from the first leakage protection. Therefore, these protections provide a good operational environment for a bearing.

The secondary object of this invention is to provide a leakproof rotary joint. After having been used for a period of time, the joint can be disassembled by unscrewing the bolt connected joint seat of the shaft seal and end cap and taking out the O-ring washer, and spring for cleaning and replacement purposes. Meanwhile, the threaded portion between the bearing seat and joint seal of the shaft seal may be unscrewed in order to change the shaft seal.

BRIEF DESCRIPTION OF THE DRAWINGS

The drawings disclose an illustrative embodiment of the present invention which serves to exemplify the various advantages and objects thereof and are as follows.

DETAILED DESCRIPTION OF THE PREFERRED EMBODIMENT

Figure 1:
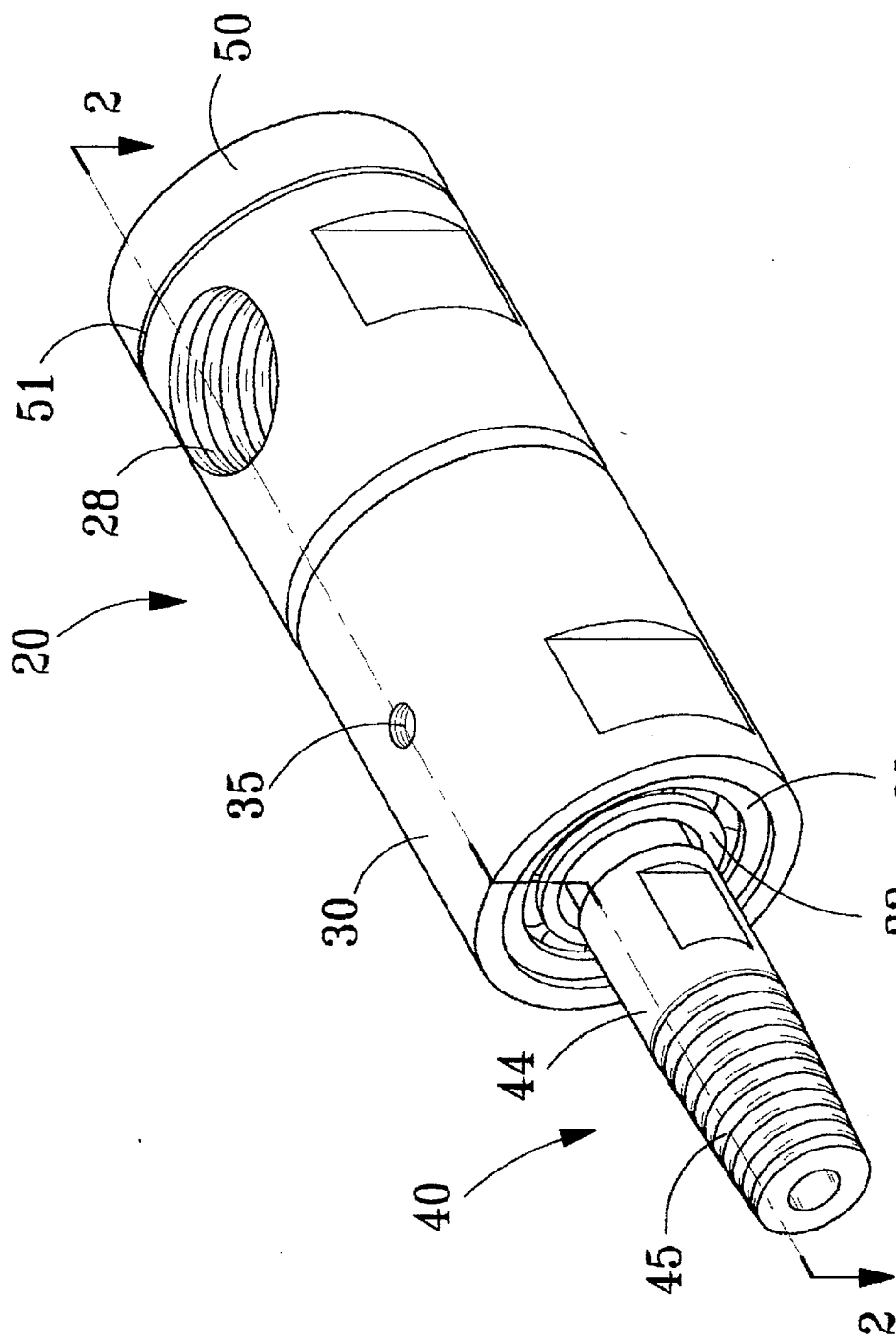
FIG. 1 is a perspective view of this invention.
Figure 2:
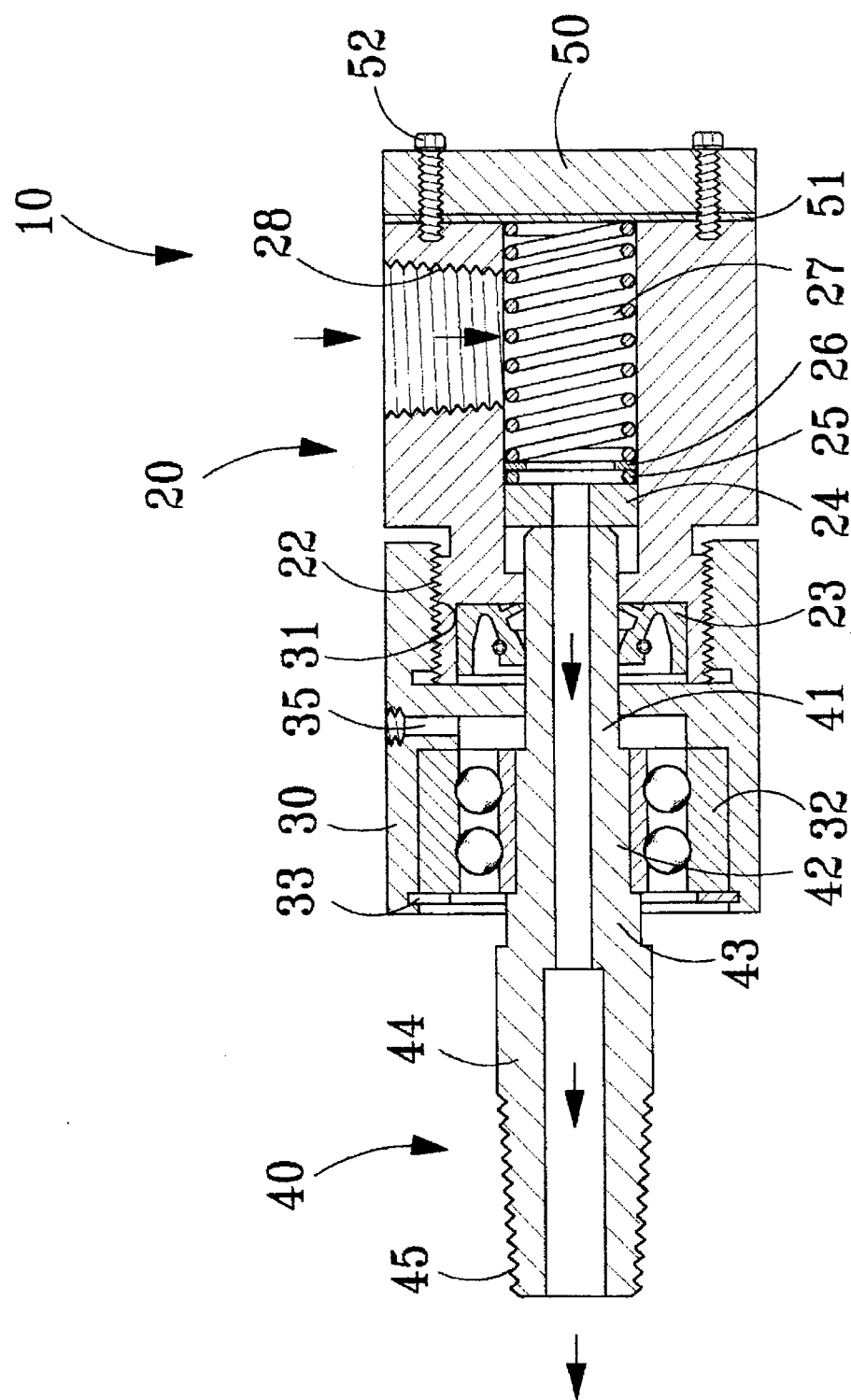
FIG. 2 is a cross-sectional view of a leakproof rotary joint as taken along section line 2—2 of FIG. 1.
Figure 3:
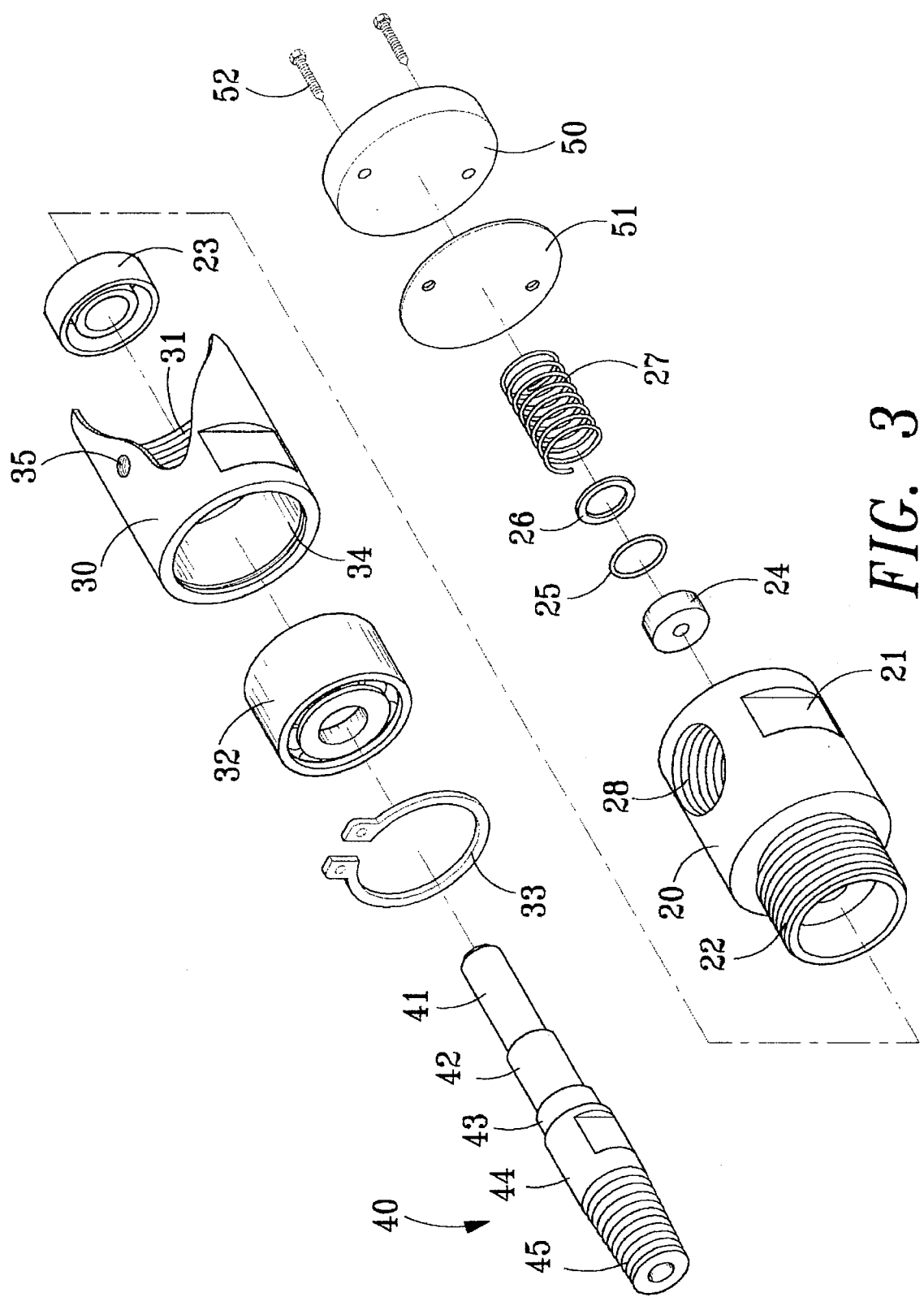
FIG. 3 is an exploded perspective view of the separate parts of this invention.

Referring to FIGS. 1–3, there is disclosed a leakproof rotary joint 10 including a joint element 20, a bearing seat 30, a rotating shaft 40 and an end cap 50.

The joint element 20 includes a tubular body 21, a threaded joint portion 22 on the front end of the tubular body 21, a shaft seal element 23 within the threaded joint portion 22, a wear block 24, an O-ring 25, a washer 26 and a spring element 27 within the tubular body 21. The tubular body 21 has a threaded port 28 for attaching the tubular body 21 to a tube which delivers fluid to joint element 20. There are also provided a leakproof washer 51 and an end cap 50 in the rear portion of the tubular body 21. The end cap 50, the leakproof washer 51 and the joint element 20 are threaded together by means of several threaded bolts 52. The leakproof washer 51 provides the functions of tightness and leakproof for securing the joint element 20 to the end cap 50. After the leakproof rotary joint has been used for a period of time, the threaded bolts 52 may be unscrewed to take out the O-ring element 25, the leakproof washer element 26, the spring element 27 and the shaft seal 23 for the purpose of cleaning or replacement.

Internal thread 31 on the one end of the bearing seat 30 is threaded into the threaded joint portion 22. However, a bearing element 32 inside the other end of the bearing seat 30 is secured by a C-clip 33 engaged within an annular groove 34 of the bearing seat 30. An inspection hole 35 in the radial direction of the bearing seat 30 acts as the lubricant inlet hole of the bearing element 32 and permits inspection of impurities. Any leaking impurities can be measured immediately by means of the inspection hole 35 in order to permit appropriate actions.

When the joint element 20 and the bearing seat 30 are threaded together, the rotating shaft 40 is engaged into the bearing element 32 with a tight connection. The rotating shaft 40 includes the first portion 41, the second portion 42, the third portion 43 and the fourth portion 44. When the rotary shaft 40 is put into the bearing element 32, the end face of the first portion 41 will come in tight contact with the side face of wear block 24, the shaft seal element 23 will be located on the first portion 41, the bearing element 32 will be located on the second portion 42, and the end of the fourth portion 41 includes a threaded portion 45 which can be threaded into an outlet fluid tube.

As shown in FIG. 2, a mixed fluid with solid materials, for example, grinding materials, impure water and so on, can be delivered from threaded port 28 of joint element 20. The rotating shaft 40 rotates at a high rate of speed so that the mixed fluid flows in the axial direction of rotating shaft 40, as indicated by the arrow. Because of the two characteristics of shaft seal element 23 provides wear endurance and leakproof capability, this invention also provides two leakage protections. The first leakage protection includes a wear block and the end face of a shaft compressing each other tightly with an O-ring for outer leakage protection. In addition, a washer and a spring press the wear block and the end face of the shaft rightly in order to prevent primary leakage and filter most solid impurities. The second leakage protection is the shaft center being covered with a shaft seal to seal the shaft surface tightly in order to isolate the leaking fluid from the first leakage protection. Therefore, these protections provide a good operational environment for a bearing.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A leakproof rotary joint comprising:
   a) a joint element, an end cap, a bearing seat and a rotary shaft;
   b) the joint element including a threaded port for receiving a mixed fluid, a first end secured to the end cap and a threaded second end, a spring disposed within the joint element adjacent the end cap, a first washer engaged by the spring, an O-ring and a wear block disposed within the joint element, the O-ring being positioned between the wear block and the first washer and a shaft seal element disposed in the threaded second end;
   c) the bearing seat including a threaded first end in threaded engagement with the threaded second end of the joint element, a second end, a bearing element disposed within the second end, and means for securing the bearing element to the second end;
   d) a rotatable shaft secured within the bearing seat and extending through the bearing element and the shaft seal element, the shaft seal element being in sealing engagement around the rotatable shaft, the rotatable shaft including a first end having a face disposed in abutting engagement with the wear block, the spring urging the wear block against the first end face, and a second threaded end for engagement with an outlet fluid tube; and
   e) wherein a first leakage protection is defined by the spring urging the first washer and O-ring against the wear block and the latter against the first end face of the rotatable shaft and a second leakage protection is defined by the shaft seal element being disposed in sealing engagement around the rotatable shaft.

2. The rotary joint of claim 1 wherein the bearing seat further includes a radially extending hole formed therein for lubrication and inspection of the bearing seat.

3. The rotary joint of claim 1 further including a second washer disposed between the end cap and first end of the joint element.

4. The rotary joint of claim 1 wherein the means for securing the bearing element to the bearing seat includes an annular groove formed in the second end of the bearing seat and a C-shaped clip engaged within the annular groove.

* * * * *